US008697259B2

(12) United States Patent
Ras et al.

(10) Patent No.: US 8,697,259 B2
(45) Date of Patent: Apr. 15, 2014

(54) BORON CARBIDE COMPOSITE MATERIALS

(76) Inventors: Anine Hester Ras, Springs (ZA);
Frances Van Staden, Springs (ZA);
Ronald A. Abramshe, Springs (ZA);
Kaveshini Naidoo, Springs (ZA)

( * ) Notice: Subject to any disclaimer, the term of this patent is extended or adjusted under 35 U.S.C. 154(b) by 184 days.

(21) Appl. No.: 12/992,786

(22) PCT Filed: May 18, 2009

(86) PCT No.: PCT/IB2009/052053
§ 371 (c)(1),
(2), (4) Date: Feb. 22, 2011

(87) PCT Pub. No.: WO2009/138970
PCT Pub. Date: Nov. 19, 2009

(65) Prior Publication Data
US 2011/0132184 A1    Jun. 9, 2011

(30) Foreign Application Priority Data

May 16, 2008   (GB) .................................... 0808939.3
Aug. 5, 2008   (GB) .................................... 0814307.5

(51) Int. Cl.
*B32B 9/00*      (2006.01)
*B32B 9/04*      (2006.01)
*C04B 35/52*     (2006.01)
*C04B 35/56*     (2006.01)

(52) U.S. Cl.
USPC ............................ 428/704; 428/688; 501/87

(58) Field of Classification Search
USPC .................... 428/688, 704; 501/87
See application file for complete search history.

(56) References Cited

U.S. PATENT DOCUMENTS

| 3,136,615 | A  | * | 6/1964  | Wentorf, Jr. et al. ............. 51/307 |
| 5,230,718 | A  | * | 7/1993  | Oki et al. ......................... 51/295 |
| 6,179,886 | B1 |   | 1/2001  | Gordeev et al. |
| 6,709,747 | B1 | * | 3/2004  | Gordeev et al. ............... 428/408 |
| 6,862,970 | B2 |   | 3/2005  | Aghajanian et al. |
| 2006/0242911 | A1 | * | 11/2006 | Ras et al. ........................ 51/307 |
| 2006/0280638 | A1 |   | 12/2006 | Wittmer et al. |

FOREIGN PATENT DOCUMENTS

| GB | 1 595 517     | 8/1981 |
| GB | 1 595 517 A   | 8/1981 |
| JP | 55-062845 A   | 5/1980 |
| JP | 2001-515836 A | 9/2001 |

(Continued)

OTHER PUBLICATIONS

Combined Search and Examination Report issued by UK Intellectual Property Office on Sep. 17, 2008 for corresponding British application 0808939.3.

(Continued)

*Primary Examiner* — Noah Wiese
(74) *Attorney, Agent, or Firm* — Frommer Lawrence & Haug LLP; Ronald R. Santucci

(57) ABSTRACT

The invention relates to a boron carbide composite material comprising diamond particles and boron carbide, the composite material having a porosity of less than 2 percent by volume. The invention further relates to a method for manufacturing such materials, the method including coating a plurality of diamond particles with boron carbide, combining the plurality of diamond particles to form a green body and subjecting the green body to a temperature in the range from about 1,200 degrees centigrade to about 2,000 degrees centigrade and pressure or vacuum not exceeding about 2,000 Mpa.

5 Claims, 2 Drawing Sheets

(56) References Cited

FOREIGN PATENT DOCUMENTS

| | | |
|---|---|---|
| JP | 2001-515927 A | 9/2001 |
| JP | 2002-525262 A | 8/2002 |
| JP | 2008-239476 A | 10/2008 |
| WO | WO 90/09361 A | 8/1990 |
| WO | WO 99/12866 A | 3/1999 |
| WO | WO 99/12867 A | 3/1999 |
| WO | WO 00/18702 A | 4/2000 |
| WO | WO 2005/017227 A | 2/2005 |
| WO | WO 2005/079207 A | 9/2005 |
| WO | WO 2007/088461 A | 8/2007 |

OTHER PUBLICATIONS

Abramshe PhD, Ron: "Improving Ceramic Armor Performance with Better Materials", http://www.ceramicindustry.com/copyright/1063f67934bfd010VgnVCM100000f932a . . . , posted Oct. 1, 2006, 4 pages.

Office action issued by Japanese Patent Office for corresponding Japanese application No. 2011-509077 dated Jan. 25, 2013 with English translation.

* cited by examiner

BORON CARBIDE COMPOSITE MATERIALS

This application is a 371 of PCT/IB2009/052053 filed on May 18, 2009, published on Nov. 19, 2009 under publication number WO 2009/138970 A and claims priority benefits of British Patent Application Number 0808939.3 filed May 16, 2008 and British Patent Application No. 0814307.5 filed Aug. 5, 2008, the disclosures of both are incorporated herein by reference.

This invention relates to boron carbide composite materials comprising boron carbide and diamond and a method for manufacturing boron carbide composite materials. Such materials may typically be used in applications such as armour, cutting, drilling and machining tools and operations involving abrasive wear.

BACKGROUND

Composite compacts comprising boron carbide are used for ballistic armour and wear-resistant components. A major advantage of boron carbide is that it is extremely hard and has low density, making it the best known material for use in body armour. Consequently, boron carbide-based body armour represents the state of the art. The stopping of ballistic projectiles by a ceramic-based material is a complex, dynamic and poorly understood process. Nevertheless, it is believed that hardness and compressive strength are important properties of materials suitable for this purpose and that the strength of the material should exceed about 200 MPa. The fracture and erosion of the projectile by the armour system before it penetrates deeply into the armour material is thought to increase its effectiveness in defeating the projectile. The presence of porosity and/or soft phases are believed to deleteriously affect the performance of ceramic composite armour, as well as the performance of tools for machining, cutting, drilling or degrading hard or abrasive bodies.

U.S. Pat. No. 6,862,970 discloses a method for producing a composite boron carbide material by a reaction-bonding process that features a significant fraction of boron carbide. A molten infiltrant containing silicon and one or more sources of boron is contacted to a porous mass that contains at least some boron carbide, and also containing at least some free carbon. The molten infiltrant infiltrates the porous mass without a pressure or vacuum assist to form a composite body of near theoretical density. The silicon component of the infiltrant reacts with the free carbon in the porous mass to form in-situ silicon carbide as a matrix phase. Further, the tendency of the molten silicon to react with the boron carbide component can be suppressed or at least greatly attenuated by the alloying or doping of the silicon with the boron source. The resulting composite body thus comprises boron carbide dispersed or distributed throughout the silicon carbide matrix. Typically, some residual, unreacted infiltrant phase containing silicon and boron is also present and similarly distributed or interspersed throughout the matrix.

PCT publication number WO2005079207 discloses a composite material comprising a matrix component comprising an alloy comprising silicon having dissolved therein at least one substance comprising boron and at least one substance comprising carbon and a reinforcement component comprising boron carbide, said reinforcement phase distributed throughout said matrix, said boron carbide being substantially unaffected by said alloy. The composite material is produced by a process comprising providing a molten infiltrant comprising silicon having dissolved therein boron and carbon, and infiltrating molten infiltrant into a porous mass comprising boron carbide.

An article published in 2006 (Abramshe, R, (2006), "Improving Ceramic Armor Performance with Better Materials", *Ceramic Industry*, October issue, published by BNP Media, Troy, Mich., USA) disclosed that ceramic materials that offer ballistic protection such as boron carbide, silicon carbide, silicon nitride, and mixtures of boron and silicon carbide can be improved and that new composites with a harder material, like synthetic diamond, have been developed that increase the hardness and fracture toughness of the armor plate without adding too much additional weight. Ceramic boron carbide pieces produced by means of ultra-high pressure and temperature with an outer cover of diamond is disclosed. The purpose of the diamond outer cover, which is completely bonded to the boron carbide powder in a solid piece, is to erode completely the tip of all types of projectiles before the projectile has a chance to invade the boron carbide portion of the armor plate. Eroding the projectile increases its dwell time, thereby permitting the comminuting of the entire projectile. Because the surface energies of the two species of materials are very similar, high-temperature/high-pressure, hot pressing or reaction bonding can be achieved with a small increase in cost (mainly due to the cost of the synthetic diamond).

PCT publication number WO90/09361 discloses a diamond composite comprising diamond particles bound together in a matrix of an oxide or non-oxide ceramic other than silicon carbide wherein the diamond particles comprise less than 70 volume percent of the composite. The composites of the present invention may be formed by techniques such as hot pressing, hot isostatic pressing or pressureless sintering. A disclosed method of forming the compositions involves taking an intimate mixture of diamond particles and a powder of an oxide or non-oxide ceramic, compacting the mixture and densifying/sintering it in a reducing environment at temperatures below 1,750 degrees centigrade and pressures not exceeding 200 MPa. Composites containing between 20 percent and 40 percent diamond particles by volume appear to exhibit optimum properties. Examples of non-oxide ceramics include silicon nitride, aluminum nitride, chromium carbide, titanium diboride, boron carbide and boron nitride. Twelve examples are disclosed. Each composite sample was subjected to X-ray diffraction in order to determine the extent to which the diamond particles had transformed to graphite if at all. The result of this measurement was reported in example 12, where the resulting composite as determined by X-ray diffraction was a dense material containing chromium carbide, graphite, and diamond.

GB patent number 1 595 517 discloses a process for the manufacture of hard wear resistant metal bodies comprises admixing metal powder, a powdered broronising agent consisting of boron and/or boron carbide and/or titanium boride in an amount of up to 25 percent by weight of the metal powder, and a powdered boronising activator in an amount of up to 30 percent by weight of boronising agent, placing the mixture in a mould, compacting the mixture to a density of at least a percentage of the theoretical value, and sintering the body so formed at temperatures of 700 degrees centigrade to 1,300 degrees centigrade under a protective atmosphere. An embodiment is disclosed wherein metal powders, such as cobalt or nickel, for example, can have even harder abrasive particles of material such as diamond and/or cubic boron nitride embedded therein, before and/or after the metal powder is boronised. This enables cutting tools for very hard materials to be obtained. Thus, a metal bonded abrasive body may be manufactured by the process of the invention, with diamond or cubic boron nitride abrasive particles held in a metal bonding matrix, the metal bonding matrix consisting of cobalt, present in an amount of at least 50 percent by weight and substantially uniformly distributed through the matrix, and the metal bonding matrix may consist substantially only of cobalt and boron in the form of cobalt borides, wherein the boron is present in an amount of 0.5 to 3 percent by weight of the matrix and wherein the abrasive particle content of the body is 5 to 15 percent by volume of the body.

United State patent publication number 2006/280638 discloses an intermetallic bonded composite, wherein the ceramic carbide is selected from a group consisting of titanium carbide (TiC), silicon carbide (SiC), tungsten carbide (WC), and boron carbide. The composite is formed by a process of milling the high-temperature intermetallic binder and diamond particles, pressing the high-temperature intermetallic binder and diamond particles, and, sintering the high-temperature intermetallic binder and diamond particles to form the intermetallic-bonded diamond composite, wherein the high-temperature intermetallic binder comprises an alloy having a processing temperature of at least about 1,200 degrees centigrade.

There is an ongoing urgent need for boron carbide-based ceramic composites that have improved ballistic projectile stopping (defeating) properties, or which are suitable for cutting, machining, drilling or degrading hard or abrasive materials, but which are also cost-effective.

SUMMARY OF THE INVENTION

According to a first aspect of the invention there is provided a boron carbide composite material comprising diamond particles and boron carbide, the material having a porosity of less than 2 percent by volume.

Preferably the boron carbide composite material comprises diamond particles and boron carbide particles.

Preferably the average size of the diamond particles is within 50 micrometers of the average size of the boron carbide particles, and more preferably the average size of the diamond particles is within 20 micrometers of the average size of the boron carbide particles. This relationship between the average sizes of the diamond and boron carbide particles is believed to be advantageous for armour applications. The size distribution of the diamond particles and/or the boron carbide particles may be mono-, bi- or multimodal.

Preferably the porosity is less than 1 percent by volume, and more preferably the porosity is less than 0.5 percent by volume, and yet more preferably the composite material is substantially free of pores.

Preferably the boron carbide composite material comprises less than 2 weight percent graphite, more preferably the composite material comprises less than 1 weight percent graphite, and yet more preferably the composite material is substantially free of graphite.

It is important that the porosity and graphite content are as low as possible, since these are believed deleteriously to affect the ballistic projectile stopping (defeating) capability of the material. The hardness and toughness of the material are also both important for cutting, machining, drilling and degrading hard or abrasive materials.

Preferably the composite material further comprises silicon carbide. Silicon carbide is a hard material and may fill interstitial regions among the diamond and boron carbide particles, thereby reducing or eliminating porosity and improving the overall hardness and toughness of the material.

Preferably the composite material comprises less than 10 weight percent unreacted silicon, more preferably less than 7 weight percent unreacted silicon, and yet more preferably less than 5 weight percent unreacted silicon. Unreacted or free silicon is relatively soft and its presence tends to reduce the hardness and ballistic projectile stopping capability of a composite material.

Preferably there is a layer associated with and at least partially surrounding each (but not necessarily all) diamond particle, in which layer both boron and carbon are present and in which the ratio of boron to carbon may increase with radial distance from the particle. Such a layer is believed to stabilise the diamond particles against transformation to graphite and promote bonding of the diamond particles to the surrounding boron and/or carbon-containing material.

Preferably, the layer is micro-structurally and/or compositionally distinct from both the diamond particles and from any boron carbide particulates or particles that may be present.

Preferably, the associated layer is an integral part of the diamond particle or is a coating layer that is bonded to its surface.

Preferably the boron carbide composite material comprises in the range from about 0.5 weight percent to about 40 weight percent of boron carbide and in the range from about 10 weight percent to about 60 weight percent diamond. More preferably the boron carbide composite material comprises in the range from about 15 weight percent to about 30 weight percent of boron carbide and in the range from about 30 weight percent to about 50 weight percent diamond.

Preferably the boron carbide composite material is capable of carrying (conducting) an electrical current. This allows the material to be shaped and cut my means of elecro-discharge machining (EDM) methods. In one embodiment, the boron carbide is present in the green body at an amount in the range from 0.5 weight percent to 2 weight percent, preferably about 1 weight percent, preferably just sufficient to render the composite material capable of carrying an electric current sufficient to permit EDM methods to be applied to it.

The boron carbide composite materials according to, the invention may be suitable for use in armour applications, including body armour, since they are light-weight, enhanced with the super hard material, namely diamond, and have low or negligible porosity and low or negligible content of a soft phase such as graphite. Owing to their very high hardness, the composite materials of the present invention are suitable for machining, cutting, drilling or degrading hard or abrasive materials such as rock, concrete, stone, metals, ceramics, certain types of wood products and composite materials.

According to a second aspect of the invention there is provided a method for manufacturing boron carbide composite materials comprising boron carbide and diamond as hereinbefore described, the method including coating a plurality of diamond particles with boron carbide, combining the plurality of diamond particles to form a green body and subjecting the green body to a temperature in the range from about 1,200 degrees centigrade to about 2,000 degrees centigrade and pressure or vacuum not exceeding about 2,000 MPa. Preferably the pressure does not exceed about 1,000 MPa.

Such temperatures and pressures are within the reach of conventional sintering systems, avoiding the need to use ultra-high pressure furnaces which would significantly increase the cost.

A green body is a term known in the art of hard-metal and ceramic manufacture and refers to an article intended to be sintered but which has not yet been sintered. It is generally self-supporting and has the general form of the intended finished article. A green body is typically formed by combining powders with a small amount of binder, depositing the combined powder mix in a mould and compacting the powder by the application of pressure.

The diamond particles are preferably coated with boron carbide prior to the step of combining them.

Preferably the green body is porous.

A sintering aid such as silicon or elemental boron, binder material, or pre-cursor to a binder material may be introduced into the green body. This can be achieved by including the sintering aid as a component of the coating or as an admixed particulate component or it may be introduced by infiltration into a porous green body.

In a preferred embodiment, the method includes infiltrating liquid silicon or boron into the green body, and more preferably the method includes infiltrating liquid silicon into the green body.

Preferably the pressure is in the range from greater than 0 MPa to not more than about 1,000 MPa, and more preferably the pressure is in the range from greater than 0 MPa to not more than about 200 MPa, and yet more preferably the pressure is in the range from greater than 0 MPa to not more than about 100 MPa.

Preferably the temperature exceeds about 1,000 degrees centigrade, but is selected in order to minimize thermal degradation of the diamond. Preferably the temperature does not exceed about 2,000 degrees centigrade. Where the method does not include infiltrating the green body with liquid silicon, the temperature preferably does not exceed about 1,500 degrees centigrade.

Preferably, the method includes blending the plurality of diamond particles with a plurality of boron-containing particles to form a blended mix and compacting the blended mix to form the green body.

Preferably the boron-containing particles are boron carbide particles.

Particles of preselected ceramic material may be incorporated in the green body, the ceramic material preferably selected from the group consisting of alumina, carbides, borides and nitrides such as titanium diboride, silicon carbide and silicon nitride.

Preferably the boron carbide coating is chemically bonded to the diamond particles. Preferably the coating comprises a portion that is substantially microcrystalline.

The thickness of the boron carbide coating is preferably in the range from about 0.01 micrometers to about 5 micrometers, more preferably the thickness of the boron carbide coating is in the range from about 0.5 micrometers to about 3 micrometers, and yet more preferably the thickness of the boron carbide coating is in the range from about 1 micrometer to about 3 micrometers. The boron carbide coating is preferably as thick as necessary in order for the benefits of its use to be achieved, but not substantially thicker than this.

The size of the diamond particles may be within the range from about 0.005 micrometers to about 2,000 micrometers, preferably within the range from about 0.5 micrometers to about 300 micrometers, more preferably within the range from about 1 micrometer to about 100 micrometers, and yet more preferably in the range from about 10 micrometers to about 70 micrometers.

The boron carbide coating on the diamond particles is preferably carbon rich at the diamond-coating interface and boron-rich at the surface of the coating that is remote from the diamond. Such a gradient in the coating results in better compatibility between the thermal expansion properties of the diamond and coating at the interface, as well as enhanced diffusion of carbon through the coating during the sintering process to achieve superior sintering of the compact.

According to a third aspect of the invention there is provided a method for manufacturing a boron carbide composite material comprising boron carbide and diamond as hereinbefore described, the method including blending a plurality of coated diamond particles with a plurality of boron-containing particles to form a blended mix, forming the blended mix into a green body and subjecting the green body to elevated temperature and pressure not exceeding about 2,000 MPa. Preferably at least a fraction of the diamond particles is not coated with boron carbide. Preferable the boron-containing particles are boron carbide.

Preferably the boron carbide composite materials are according to the present invention.

According to a fourth aspect of the invention there is provided a method for manufacturing a boron carbide composite material comprising boron carbide, silicon carbide and diamond as hereinbefore described, the method including the steps of combining a plurality of diamond particles with a plurality of boron carbide particles to form a blended mix, forming the blended mix into a porous green body, contacting the green body with a source of silicon, subjecting the green body and the source of silicon to a temperature above the melting point of silicon to result in molten silicon infiltrating into the green body and reacting with carbon in the green body to form silicon carbide. When the silicon melts, it infiltrates, or wicks into the pores of the green body.

Preferably the boron carbide composite materials so manufactured are according to the present invention.

Preferably at least a fraction, more preferably at least 20%, and yet more preferably at least 90% of the diamond particles are pre-coated with a carbide material, such as silicon carbide, boron carbide, titanium carbide, tantalum carbide and tungsten carbide or with alumina, in order to stabilise the diamond against transformation to graphite and to improve bonding of the diamond particles to surrounding material.

Preferably at least 20% of the diamond particles have a boron carbide coating, more preferably at least 90% of the diamond particles have a boron carbide coating. Preferably the boron carbide coating incorporates a quantity of unreacted boron. Without being limited by theory, the unreacted boron is believed to diffuse into the molten silicon on contact and have the effect of reducing the reactivity of the silicon with the boron carbide particles.

Preferably the green body and the source of silicon are heated to a temperature above the melting point of silicon while subjected to a pressure or a vacuum that is lower than that at which diamond is thermodynamically stable at the temperature.

Preferably the temperature is in the range from about 1,200 degrees centigrade to not more than about 2,000 degrees centigrade and the pressure does not exceed about 2,000 MPa.

Preferably the green body comprises more than about 3 weight percent and more preferably more than about 5 weight percent organic binder.

In one embodiment, the green body comprises sufficient boron carbide to render the finished boron carbide composite material capable of being cut by means of electro-discharge machining (EDM). In this embodiment, the boron carbide is present in the green body at an amount in the range from 0.5 weight percent to 2 weight percent, preferably about 1 weight percent.

According to a fifth aspect of the invention there is provided a boron carbide composite material comprising diamond particles, boron carbide particles and silicon carbide.

According to a sixth aspect of the invention there is provided an anti-ballistic armour assembly comprising a boron carbide composite material according to the present invention or manufactured using a method according to the present invention.

Preferably the anti-ballistic armour assembly includes an incident projectile defeating body comprising first and second opposed surfaces and a first and second region, the first (outer) surface adapted to be, in use, closer to the incident projectile, the first region being proximate the first surface and the second region being proximate the second surface, the first region comprising boron carbide and coated diamond particles as hereinbefore described and the second region having substantially no diamond content.

The incident projectile defeating body may be a single, coherent component or it may comprise more than one discrete sub-component arranged, for example, as layers, interleaved tiles, mosaics or "scale"-like structures.

According to a seventh aspect of the invention there is provided an insert component for a tool for machining, cutting, drilling or degrading hard or abrasive material, the insert component comprising boron carbide composite material according to the present invention.

Preferably the insert component is for use in a drill bit for boring into the earth or boring into rock formations, as may be used in the oil and gas drilling industry.

According to an eighth aspect of the invention, there is provided a coated diamond particle wherein the coating comprises both boron and carbon, the coating comprising a first (inner) region proximate the diamond surface and a second (outer) region proximate the surface of the coating, the ratio of boron to carbon being different in the inner and outer regions of the coating.

Preferably the coated diamond particle is suitable for use in the present invention.

The coating may be deposited or otherwise formed on the diamond surface in at least one distinct step, or it may be formed integrally with the diamond by having boron introduced into the reaction volume during diamond synthesis, these approaches not being mutually exclusive.

Preferably the ratio of boron to carbon is less than 1:4 in the first or inner region and greater than 2:1 in the second or outer region.

The second outer region of the coating extends from the surface into the coating to a depth of between approximately about 0.01 to 0.1 micrometers.

Preferably the coating has an average thickness of greater than about 0.5 micrometers, and preferably comprises a micro-crystalline component.

Additional coatings may also be applied onto the coated diamond as described above.

The benefits of coating the diamond particles with boron carbide are believed to include stabilising the surface of the diamond particles against conversion into graphite, enhancing the bonding and retention of the diamond particles within the composite, retarding the dissolution or diamond into proximate phases, retarding chemical reaction with proximate phases and enhancing certain properties of the sintered composite material, particularly the hardness, toughness, strength, thermal conductivity and abrasion resistance of the material. The coating is also believed to improve the dispersion of the diamond particles within the composite by reducing their agglomeration, for example.

A further benefit of pre-coating the diamond particles with boron carbide is that process conditions optimised for the manufacture of known boron carbide compacts according to known methods have only to be minimally adapted (if at all) to account for the presence of the diamond.

Boron carbide composite material according to the present invention is suitable for use in parts that are exposed in use to abrasive environments, such as wear parts (e.g. nozzles) and cutting tools. The boron carbide composite material is also suitable for use in load-bearing components, such as bearings.

DRAWING CAPTIONS

Non-limiting embodiments will now be described with reference to the accompanying drawings of which:

FIGS. 1 and 2 each shows an electron micrograph showing a cross-section of a diamond particle with a coating comprising boron and carbon. The micrographs have different magnifications.

DETAILED DESCRIPTION OF PREFERRED EMBODIMENTS

In preferred embodiment of the method for manufacturing a boron carbide composite material according to the present invention includes preparing a green body comprising diamond particles and boron carbide particles, and infiltrating the green body with liquid silicon. The green body is prepared by blending a quantity of diamond powder having average particle size in the range from about 1 micrometer to about 100 micrometers with a quantity of $B_4C$ particles having average size in the same range to form a blended mix. Minor quantities of less than about 10 weight percent of other carbide ceramics such as TiC may be included in the blended mix. It is important that the $B_4C$ particles are milled and blended uniformly with the diamond particles. Oxidation of the $B_4C$ particles should be minimised by using alcohol and kerosene, or kerosene without alcohol as the liquid milling and blending medium. An organic binder is then added to the blended mix, typically at a level in the range from about 2 weight percent to 10 weight percent. The blended mix is then deposited into a mould or die and uniaxially compacted at a pressure of less than about 100 MPa to form a green body. The green body is then furnaced in the presence of silicon at a temperature sufficient for the silicon to melt and infiltrates into pores within the green body, reacting with diamond and other carbon in the green body to form SiC. The infiltration methods taught in U.S. Pat. Nos. 6,179,886, 6,709,747 and 6,862,970 may be used in this embodiment.

Figure 1:
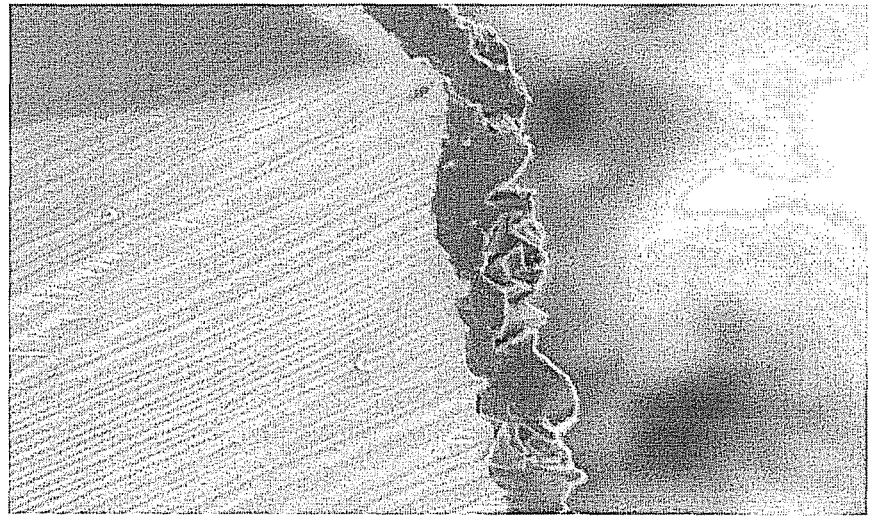
Figure 2:
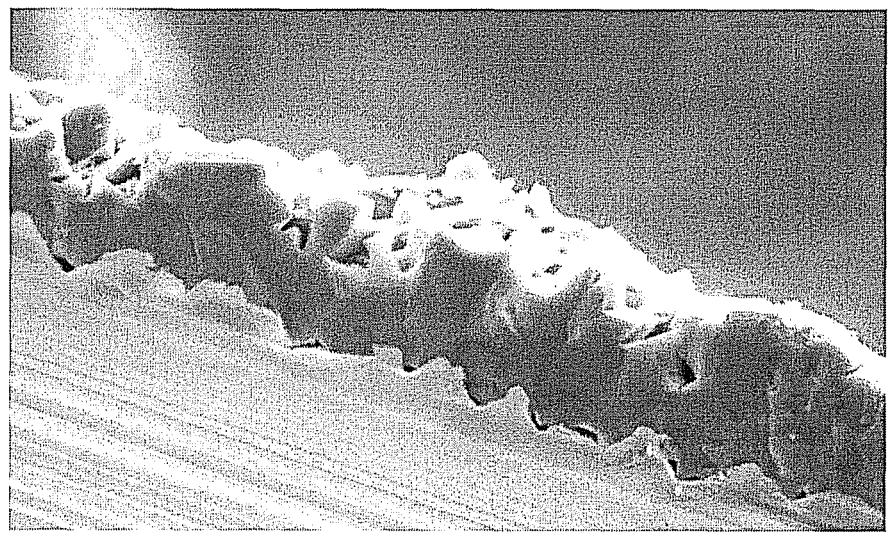
Figure 3:
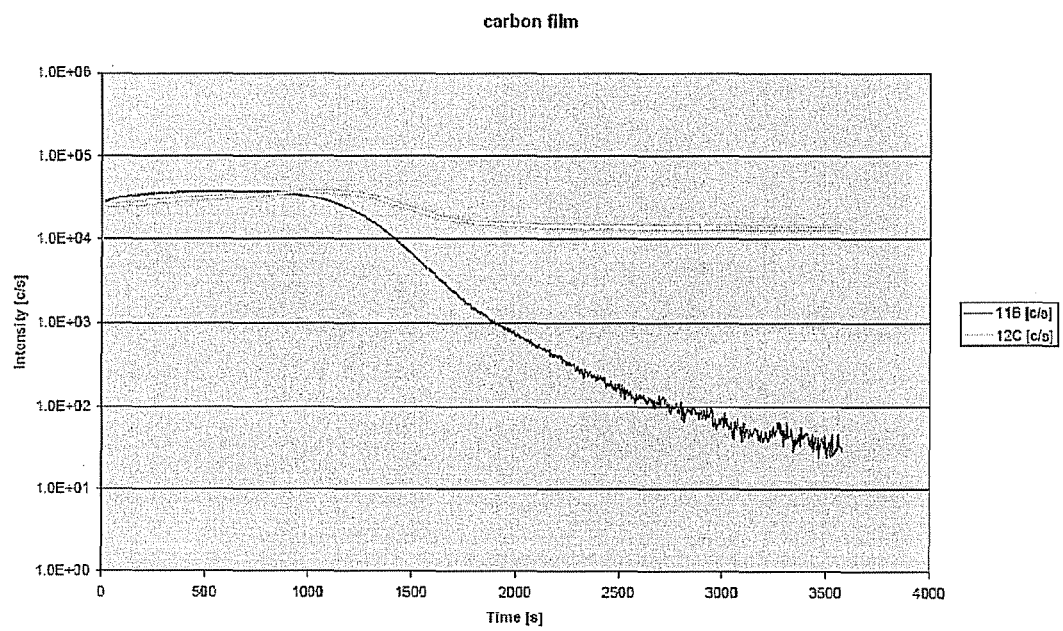
FIG. 3 shows a secondary ion mass spectrometry (SIMS) analysis of a boron and carbon coating on a diamond substrate.
Figure 4:
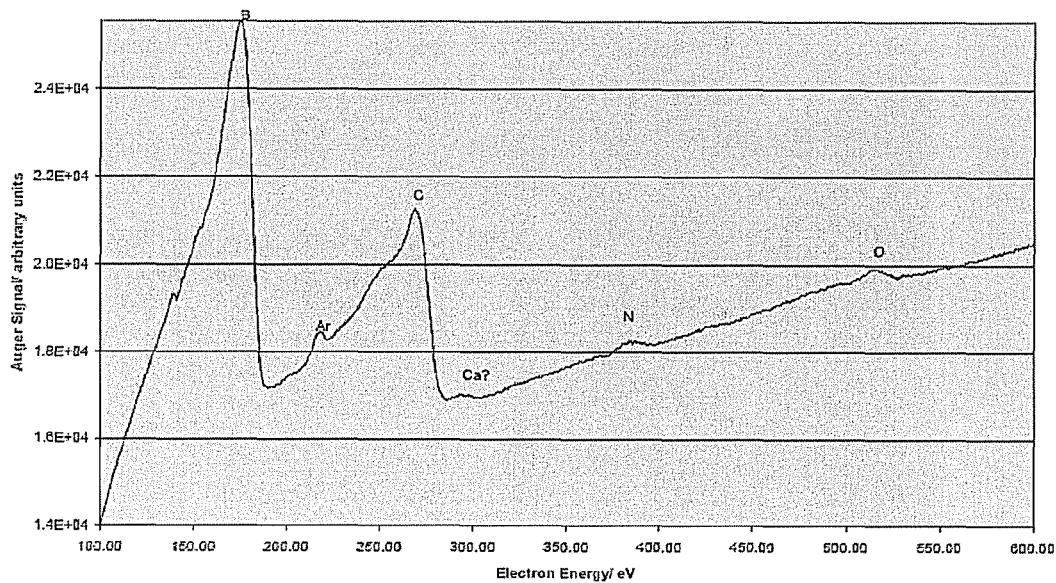
FIG. 4 shows the result of an Auger analysis of a boron and carbon coating on a diamond substrate.

In a version of this embodiment, at least some of the diamond particles are pre-coated with boron carbide. Boron carbide coatings can be produced by reacting boron with carbon from the diamond surface. This results in strong bonding of the coating to the diamond. This may be achieved by CVD or pack cementation at temperatures high enough to form boron carbide at the diamond-boron carbide interface with complete or partial conversion of the boron coating to boron carbide, or using other methods such as PVD to coat diamond with boron and subsequent heat treatment to convert part or all of the boron to boron carbide. The teachings of PCT publication WO05017227 can be followed to pre-coat the diamond particles with robust coatings of boron carbide. This method of coating diamond with boron carbide tends to result in a very rough external boron carbide coating surface, as shown in FIGS. 1 and 2. It is believed to be important that oxide is removed from the exposed surface of the diamond coating by means of a gentle milling in alcohol with kerosene or other means known in the art, since the presence of oxide may frustrate sintering. Benefits of this very rough exterior surface are believed to include improved flowability of the coated powder, which facilitates the compaction process, improved mechanical keying of the coated diamond powder into the matrix material, which improves retention of the diamond within the matrix, and improved pickup of any additional powder (for example sintering additives) with which it is mixed. The rough surface has the additional benefit that during the sintering step, the areas of point-point contact between the coated diamond particles will experience higher pressure, which will facilitate plastic deformation and improve sinterability, hardness and toughness. If some of the boron is left unreacted, this boron may function as a sintering aid.

A sintering aid may optionally be mixed or milled in, or can be deposited on the surface of the coated particle or within the coating by suitable coating or co-deposition methods, e.g. atomic layer deposition, PVD, CVD, sol-gel, colloidal or similar methods known to those skilled in the art. Examples of sintering aids include metal or rare earth oxides such as alumina, yttria, magnesium oxide, calcium oxide, silica, carbides such as silicon carbide, tungsten carbide, titanium carbide, metal borides such as titanium diboride, aluminum diboride, transition metals such as titanium, vanadium, iron, nickel, cobalt, manganese, and any combinations thereof. The sintering aids may have the additional benefit of improving the properties of the sintered compact, such as the fracture toughness. It is believed that boron carbide coating on the diamond particles may assist in dispersing sintering aids introduced in powder form, since the boron carbide coating is typically rough.

In another embodiment of the method, the green body is formed by means of slip casting. Slip-casting is a very well known method that involves the removal of water ("de-watering") from a colloidal suspension of mineral particles in a porous mold, leaving a coating that can be sintered after drying. Slip casting has been applied to oxide and non-oxide ceramics as well as metals and cermets. The process of casting a ceramic part, be it aluminum oxide, silicon nitride, silicon carbide, or boron carbide, will have generally the same processing steps, although the process may be optimized for each different ceramic by selection of binders, particle size distribution, vacuum dewatering, aging and so on. The generalized process steps include providing the ceramic powder raw materials; slip preparation; slip casting; and slip removal, leaving an unsintered green body. A type of slip casting known in the art as "thixotropic casting" and other forms of vibratory slip casting are preferred. Thixotropic casting is well suited to the production of complex shapes, is cost effective, and has relatively simple processing steps. A further advantage of thixotropic casting is its potential for the elimination of differential sedimentation. All these attributes were required for complex shaped articles such as body armor components.

There are many organic and inorganic binders available and suitable for slip casting. The common ones used in ceramic slip processing are microcellular cellulose (carbon source) mixed with alcohol. Alginates, starches (of all kinds), clays, acrylonitrile mixed with polyvinyl alcohol, various fish oils and so on may be used. The temperature conditions required to remove these types of binders from the slip is generally between 500 to 1,050 degrees centigrade. Slow ramp and hold times are also necessary to avoid cracking or shrinkage due to rapid drying.

The green body is sintered at a temperature in the range from 1,000 degrees centigrade to 2,200 degrees centigrade and a pressure in the range from 1 MPa to 40 MPa.

The invention may be used to make articles of various shapes and sizes. In particular, it can be used to make components for ballistic armour systems, such as curved breast plates for body armour, half round plates for shoulder, neck and shin armour, and full curved shapes for armoured helicopter seats. Potential applications include ballistic armour, ceramic tooling dies, cutting, drilling and milling tools, abrasion resistant components such as nozzles and grinding media.

In the case of armour, it is believed that about 90% of the particles of hard or superhard phase(s) within armour material should be less than about 100 micrometers in equivalent diameter.

EXAMPLES

Example 1

A quantity of diamond particles with average size of between about 10 and 20 micrometers were coated with a coating comprising boron and carbon according to the method taught in WO05017227. The diamond particles were blended with power comprising a 50:50 mixture of boron and boric acid to form a bed of particulate matter, which was put into a tube furnace. The bed was heat treated under argon atmosphere using the following temperature cycle:

the temperature was ramped up to 300 degrees centigrade over a period of one hour,
it was maintained at 300 degrees centigrade for 30 minutes,
then ramped up to 1150 degrees centigrade over 80 minutes,
maintained at this temperature for 6 hours,
and then allowed to cool to room temperature.

The coated diamond particles were separated from the excess boron and boric acid powder and then boiled in dilute nitric acid for 20 minutes to remove any residual boron and boric acid.

The coated diamond powder was blended with B4C particles with an average size in the range of 10 to 40 micrometers in the ratio 50 weight percent diamond:50 weight percent B4C. It is important that the B4C particles are blended uniformly with the diamond particles. Oxidation of the B4C particles should be minimised by using alcohol with kerosene, or just kerosene as the liquid milling and blending medium. It is also important that oxide is removed from the exposed surface of the diamond coating by means of a gentle milling in alcohol with kerosene or other means. The blended powder was further blended with a binder in the ratio 90 weight percent powder:10 weight percent binder. A green body was made by subjecting a quantity of the above blend to uniaxial compaction.

The binder was substantially removed from the green body by heat treatment. The green body was then furnaced in contact with silicon at temperature sufficient for the silicon to melt and infiltrate the green body.

Using image analysis, the finished material was found to comprise approx. 33% wt SiC, and the combined amount of B4C and diamond was 49% wt to 53% wt. The sintered article had the following physical properties:

Speed of sound in the range of 12,900 to 13,100 m·s$^{-1}$;
Density of 2.87 g·cm$^{-3}$;
Poisson's ratio in the range of 0.150 to 0.169;
Shear modulus in the range of 190 to 205 GPa;
Young's modulus in the range of 450 to 465 GPa;
Bulk modulus in the range of 220 to 230 GPa.

It was possible readily to cut the sintered article by means of electro-discharge machining (EDM), which indicated that it was capable of carrying an electric current. The sintered finished composite material had no visible pores and a graphite content of less than 2 weight percent.

The sintered material comprised about 7 weight percent (% wt) free or unreacted silicon, and about 7 weight percent silicides including boron

Example 2

Uncoated diamond powder was blended with B4C particles with an average size in the range of 10 to 40 micrometers in the ratio 50 weight percent diamond:50 weight percent B4C. A green body was made as in example 1, but with no pre-coated diamond particles present.

The binder was substantially removed from the green body by furnacing it. The green body was then furnaced in contact with silicon at temperature sufficient for the silicon to melt and infiltrate the green body.

Using image analysis, the material was found to comprise approx. 33% wt SiC, and the combined amount of B4C and diamond was 49% wt to 53% wt. The sintered article had similar physical properties to that produced in example 1, and again it was possible readily to cut the sintered article by means of electro-discharge machining (EDM). Again, the sintered finished composite material had no visible pores and a graphite content of less than 2 weight percent.

Example 3

Coated diamond particles were prepared as in example 1.

The coated diamond coated was blended with boron carbide powder in the weight ratio 10:90, respectively. A mass of particles was formed by means of slip casting into a layer, from which was cut a rectangular green body plate with dimensions 5 cm×5 cm×5 mm. A binder comprising a 50/50 mixture of methanol and methyl isobutyl ketone at 0.5 weight percent (of boron carbide and diamond) produced desirable qualities in the slip and final product with a short and low burnout temperature of between 150 to 220 degrees C. (i.e. a binder with a relatively low vapour pressure). Use of this "binder" resulted in reduced internal stress during drying and sintering, making the article more resilient. The presence of the carbonaceous residue of this "binder" may have enhanced the sintering of the boron carbide when compared to attempts to sinter the boron carbide without this residue.

The green body was compacted at low pressure (quasi-vacuum), with an applied pressure of 250 MPa and temperature of 1,000 degrees centigrade for 60 minutes.

The sintered finished composite material had porosity in the range from about 0.5 to 1 volume percent at most, and no graphite was detected by means of Raman spectroscopy.

Example 4

Coated diamond particles were prepared as in example 1.

A mass of coated diamond particles, but no added boron carbide particles, was formed by means of slip casting into a layer, from which was cut a rectangular green body plate with dimensions 5 cm×5 cm×5 mm. A binder comprising a 50/50 mixture of methanol and methyl isobutyl ketone at 0.5 weight percent (of boron carbide and diamond) produced desirable qualities in the slip and final product with a short and low burnout temperature of between 150 to 220 degrees C. (i.e. a binder with a relatively low vapour pressure).

The green body was compacted at low pressure (quasi-vacuum), with an applied pressure of 250 MPa and temperature of 1,000 degrees centigrade for 60 minutes.

Example 5

Five sets of five samples of boron carbide and diamond composites made according to example 2 were made at different thicknesses, namely 4 mm, 5 mm, 6 mm, 7 mm and 8 mm. Another five sets of five samples of boron carbide without added diamond were made under similar conditions. All of these samples were packaged with backing polymer to make them suitable for ballistics testing.

The invention claimed is:

1. A method for manufacturing boron carbide composite materials comprising diamond particles, boron carbide particles, and silicon carbide, the composite material having a porosity of less than 2 percent by volume, and the average size of the diamond particles being within 50 micrometers of the average size of the boron carbide particles, the method including
    combining a plurality of diamond particles with a plurality of boron carbide particles to form a blended mix,
    forming the blended mix into a porous green body,
    contacting the green body with a source of silicon,
    subjecting the green body and the source of silicon to a temperature above the melting point of silicon causing the molten silicon to infiltrate into the green body and react with carbon in the green body to form silicon carbide.

2. A method according to claim 1, wherein at least 20% of the diamond particles are pre-coated with a carbide material.

3. The method according to claim 1, comprising 15 weight percent to 30 weight percent boron carbide particles.

4. The method according to claim 1, comprising less than about 2 weight percent graphite.

5. The method according to claim 1 capable of carrying an electrical current.

* * * * *